US008867826B2

(12) United States Patent
Rzeszutek et al.

(10) Patent No.: US 8,867,826 B2
(45) Date of Patent: Oct. 21, 2014

(54) DISPARITY ESTIMATION FOR MISALIGNED STEREO IMAGE PAIRS (71) Applicant: Mitsubishi Electric Research Laboratories, Inc., Cambridge, MA (US)

(72) Inventors: Richard Rzeszutek, Toronto (CA); Dong Tian, Boxborough, MA (US); Anthony Vetro, Arlington, MA (US)

(73) Assignee: Mitusbishi Electric Research Laboratories, Inc., Cambridge, MA (US)

( * ) Notice: Subject to any disclaimer, the term of this patent is extended or adjusted under 35 U.S.C. 154(b) by 43 days.

(21) Appl. No.: 13/684,760

(22) Filed: Nov. 26, 2012

(65) Prior Publication Data

US 2014/0147031 A1     May 29, 2014

(51) Int. Cl.
G06K 9/00      (2006.01)
G06T 7/00      (2006.01)

(52) U.S. Cl.
CPC ............. *G06T 7/0075* (2013.01); *G06K 9/00* (2013.01)
USPC ........... 382/154; 382/106; 382/254; 375/240; 348/42; 348/43; 348/44

(58) Field of Classification Search
CPC ................ H04N 19/00424; H04N 19/00587; H04N 2213/005; H04N 13/0022; H04N 2013/0081; H04N 7/0806; H04N 2013/0085; H04N 19/00769; G06T 7/0075; G06T 2207/10012; G06T 2207/10021; G06K 9/20; G06K 2209/40
USPC ............. 382/106, 154, 254; 375/240; 348/42, 348/43, 44
See application file for complete search history.

(56) References Cited

U.S. PATENT DOCUMENTS

| 5,179,441 | A  | * | 1/1993  | Anderson et al. ........... 348/43  |
| 5,530,774 | A  | * | 6/1996  | Fogel ........................ 382/154 |
| 5,727,078 | A  | * | 3/1998  | Chupeau ................... 382/154 |
| 5,839,441 | A  | * | 11/1998 | Steinberg ................. 600/450 |
| 7,050,646 | B2 | * | 5/2006  | Xu et al. ................... 382/254 |
| 8,045,792 | B2 | * | 10/2011 | Koo et al. ................. 382/154 |
| 8,311,089 | B2 | * | 11/2012 | Ishikawa et al. ......... 375/240 |

(Continued)

OTHER PUBLICATIONS

J. Thevenon, J. Martinez-del-Rincon, R. Dieny and J.-C. Nebel, "Dense Pixel Matching Between Unrectified and Distorted Images Using Dynamic Programming," in International Conference on Computer Vision Theory and Applications, Rome, 2012.

L. Nalpantidis, A. Amanatiadis, G. Sirakoulis, N. Kyriakoulis and A. Gasteratos, "Dense Disparity Estimation Using a Hierarchical Matching Technique from Uncalibrated Stereo," in International Workshop on Imaging Systems and Techniques, Shenzhen, 2009.

*Primary Examiner* — Vu Le
*Assistant Examiner* — Aklilu Woldemariam
(74) *Attorney, Agent, or Firm* — Dirk Brinkman; Gene Vinokur (57) ABSTRACT

A disparity vector for a pixel in a right image corresponding to a pixel in a left image in a pair of stereo images is determined. The disparity vector is based on a horizontal disparity and a vertical disparity and the pair of stereo images is unrectified. First, a set of candidate horizontal disparities is determined. For each candidate horizontal disparity, a cost associated with a particular horizontal disparity and corresponding vertical disparities is determined. The vertical disparity associated with a first optimal cost is assigned to each candidate horizontal disparity, so that the candidate horizontal disparity and the vertical disparity yield a candidate disparity vector. Lastly, the candidate disparity vector with a second optimal cost is selected as the disparity vector of the pixel in the right image.

11 Claims, 7 Drawing Sheets

(56) References Cited

U.S. PATENT DOCUMENTS

| | | | |
|---|---|---|---|
| 8,411,934 B2* | 4/2013 | Zhang et al. | 382/154 |
| 2004/0240725 A1* | 12/2004 | Xu et al. | 382/154 |
| 2005/0078866 A1* | 4/2005 | Criminisi et al. | 382/154 |
| 2005/0185048 A1* | 8/2005 | Ha | 348/42 |
| 2006/0133493 A1* | 6/2006 | Cho et al. | 375/240.16 |
| 2007/0052794 A1* | 3/2007 | Ha et al. | 348/42 |
| 2007/0104276 A1* | 5/2007 | Ha | 375/240.16 |
| 2008/0240549 A1* | 10/2008 | Koo et al. | 382/154 |
| 2009/0060280 A1* | 3/2009 | Choi et al. | 382/106 |
| 2011/0050853 A1* | 3/2011 | Zhang et al. | 348/44 |

* cited by examiner

DISPARITY ESTIMATION FOR MISALIGNED STEREO IMAGE PAIRS

FIELD OF INVENTION

The invention relates generally to computer vision, and more particularly to stereo matching and disparity estimation.

BACKGROUND OF THE INVENTION

Stereo matching is a method in computer vision to determine a depth of a scene, or a distance from a camera to the scene. The method uses multiple input images of the scene taken from different positions. The depth of a location in the scene corresponds to an apparent disparity between the locations in the images. Disparity matching can consider illumination, reflections, texture, and the like, to avoid mismatch errors. Occluded locations are problematic. Stereo matching assume that a stereo pair of input images is epipolar rectified, which ensures that lines-of-sight are parallel, and the matching only has to be in one dimension, horizontally when the cameras or views are displaced horizontally, and the disparity is inversely proportional to the depth. That is, small disparities correspond to large depths, and large disparities correspond to small depths.

Disparity estimation can produce a disparity map. The disparity map is a scaled version of a depth map. That, the disparity values can be converted to depth values.

Image rectification is a usual preprocessing step for disparity estimation. Generally, rectification determines matching locations in the pair of input images, and a transform to align the locations, such that it appears that the images appear as if the cameras were aligned. Rectification is complex and error prone. Even with accurate methods, it is possible that some stereo pairs produce degenerate configurations for which there is no transform. Rectification also warps the input images, and features become distorted. The matching can still fail in regions where a vertical disparity is significantly large.

One alternative uses an optical flow, which does perform a two-dimensional search. However, the optical flow is not identical to the disparity, and consequently, post-rectification is needed to convert the flow to disparity.

Thevenon et al., in "Dense Pixel Matching Between Unrectified and Distorted Images Using Dynamic Programming" International Conference on Computer Vision Theory and Application—2009, describe a method for pixel matching based on dynamic programming. The method does not require rectified images. The matching extends dynamic programming to a larger dimensional space by using a 3D scoring matrix so that correspondences between a scanline and a whole image can be determined.

Nalpantidis et al., in "Dense Disparity Estimation Using a Hierarchical Matching Technique from Uncalibrated Stereo" International Workshop on Imaging Systems and Techniques—2009, describes sub-pixel matching, using sub-sample positions and integer-sample positions between non-rectified stereo image pairs image pairs, and selecting the position that gives the best match. Therefore, that disparity estimation algorithm performs a 2-D correspondence search using a hierarchical search pattern. The disparity value is defined using the distance of the matching position. Therefore, the proposed algorithm can process, maintaining the computational load within reasonable levels.

U.S. Publication 20070064800 discloses method for estimating disparity to encode a multi-view moving picture for encoded macroblocks.

SUMMARY OF THE INVENTION

The embodiments of the invention provide a method for estimating disparity between a misaligned pair of stereo images. One embodiment performs a two-dimensional search within an existing disparity estimation framework. Examples of such frameworks are, but not limited to, semi-global scanline optimization, dynamic programming, belief propagation and winner-take-all. This relatively slow embodiment provides the optimal quality for the disparity estimation.

Another embodiment performs an 2D search within a hierarchical disparity estimation framework at each level of a multi-scale (pyramidal) representation by using the horizontal disparity from a previous level to provide a starting point for the search at the next level of the hierarchy. This faster embodiment provides a reasonable quality for the disparity.

Another embodiment performs the 2D search within a complete hierarchical disparity estimation framework. In this embodiment, a search is performed in a coarse to fine order. Each subsequent level is used to refine the estimate from the previous level. This embodiment balances quality and processing speed.

DETAILED DESCRIPTION OF THE PREFERRED EMBODIMENTS

Figure 1A:
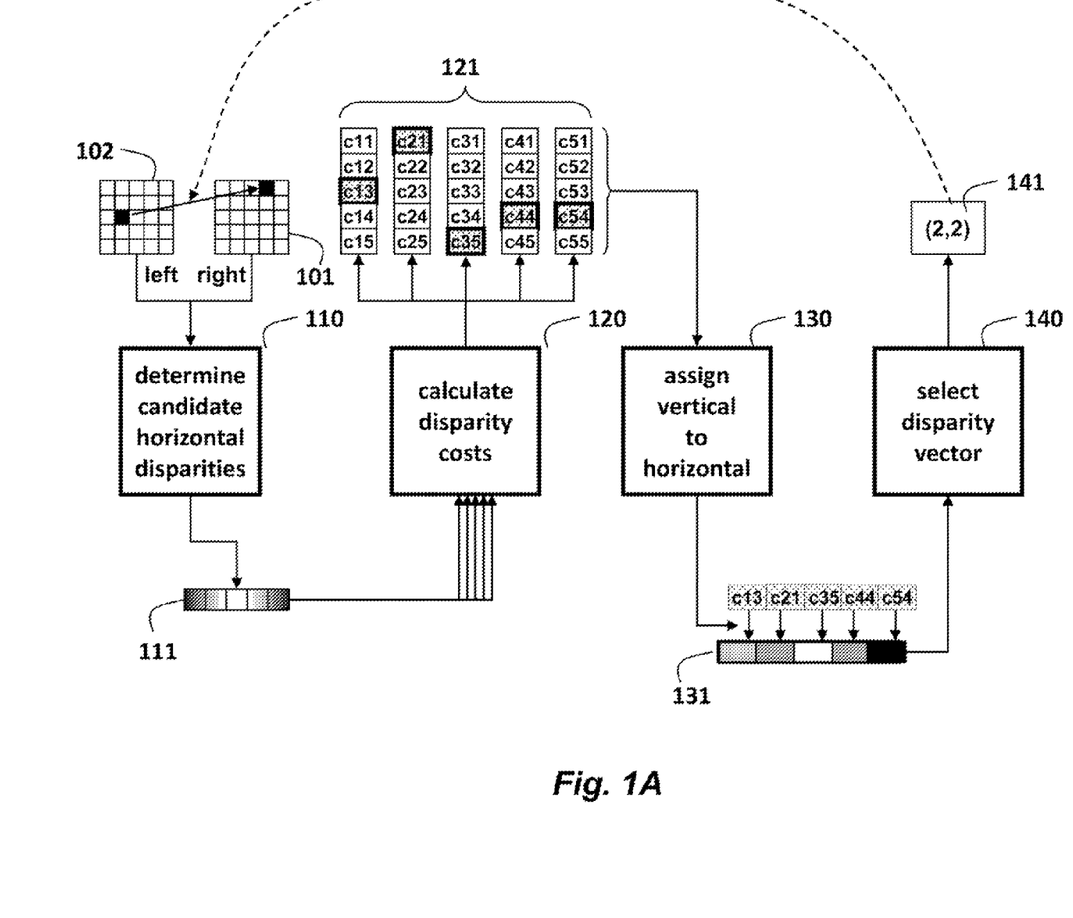
FIG. 1A is a flow diagram of a method for determining a disparity vector for a pixel in a right image corresponding to a pixel in a left image in a pair of stereo images according to embodiments of the invention.

FIG. 1A shows a method for determining a disparity vector for a pixel in a right image 101 corresponding to a pixel in a left image 102 in a pair of stereo images. Obviously, the images can be reversed. As a problem, the images are unrectified. The disparity vector is based on a horizontal disparity and a vertical disparity. The example disparities are indicated by an approximate relative intensity of the shading. The disparity vector can be thought of as a pointer in 2D from a reference pixel in the left image to the corresponding pixel in the right image, e.g., 2 up and 2 across (2, 2). On the other hand, the horizontal disparity and the vertical disparity is each a single scalar value indicating the offset of the corresponding pixel in right image in either the horizontal or vertical direction. The sign of the scalar further indicates the direction of the offset. E.g., a positive value for horizontal disparity means that the offset is to the right direction; otherwise, a negative value for horizontal disparity means that the offset is to the left direction. A positive value for vertical disparity means that the offset is to the bottom direction; and a negative value for vertical disparity means that the offset is to the top direction. Note that the sign of the disparities can be inverted with a different assumption.

A set of candidate horizontal disparities 111 is determined 110. At this stage there are multiple candidate horizontal disparities. The actual horizontal disparity vector is not selected until the final step. Theoretically, the horizontal and vertical disparities can also be inverted.

A cost ($c_{i,j}$) 121 associated with a particular horizontal disparity and corresponding vertical disparity calculated for each candidate horizontal disparity. At this step it should be clear that the cost is associated with the horizontal and the vertical disparity. It should also be clear that we process one column of Vertical disparities at a time for a first optimal cost.

The vertical disparity 121 associated with a first optimal cost, e.g., (c13, c21, c35, c44, c54) is assigned 130 to each corresponding horizontal disparity. The candidate horizontal disparity and the vertical disparity yield a candidate disparity vector 131. It should be clear that the candidate disparity vector is based on the vertical disparity that have the optimal, e.g., minimal or least, cost for a particular horizontal disparity.

Then, the candidate disparity vector with a second optimal cost is selected 140 as the disparity vector 141 of the pixel, e.g., up two, and two to the right. The terms first and second are used here to capture the idea of selecting, e.g., the least cost among a set of least cost vectors.

Figure 1B:
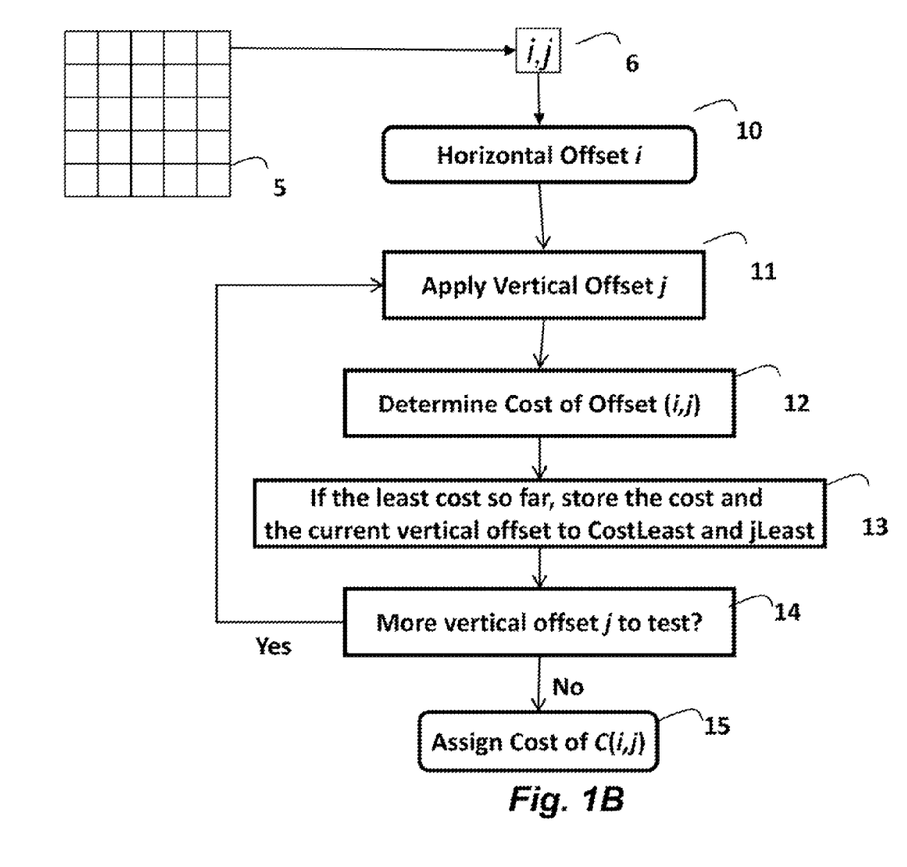
FIG. 1B is a flow diagram of a procedure for determining a matching disparity costs of a 2D search used in the method of FIG. 1A.

FIG. 1B shows a process for determining a matching cost in a cost field 200 using a bounded 2D search according to embodiments of our invention.

The method performs a 2D search near each pixel 6 at a location (x, y) in an (right) image 5 to find a least cost horizontal disparity given a vertical disparity. The pixel 6 corresponds to a pixel in the left image. For each horizontal disparity there is a horizontal offset i 10, and a set of corresponding vertical disparities where a vertical offset j 11 can be applied. Therefore, a vertical search is performed. A cost of the offset (i, j) is first determined 12 and the least cost identified and its corresponding disparity is temporarily stored 13. The vertical search is performed for all vertical disparities 14. Lastly, the least cost c(i, j) is assigned 15 to the horizontal disparity. Note that the vertical disparity or the vertical offset can be zero.

Figure 2:
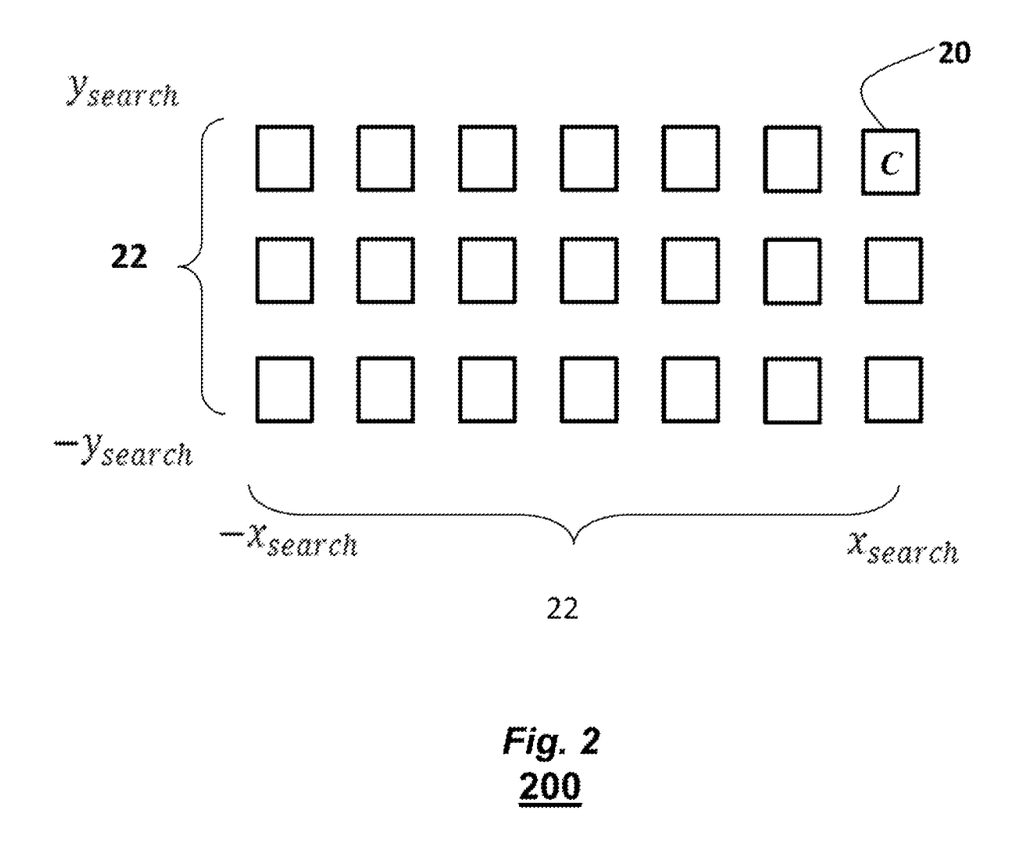
FIG. 2 is a schematic of a part of a 2D cost field according to embodiments of the invention.

FIG. 2 shows the 2D cost field. Each offset (i, j) is assigned (15 in FIG. 1B) the matching cost C(x, y|i, j) 20 for a disparity in a bounded range $x_{-search} \le i \le +x_{search}$ and $y_{-search} \le j \le y_{search}$ 22. The variable search specifies the "nearness" or bounds of the pixels over which the search is performed.

The volume produced by the cost function 20 is four-dimensional, and for an image of width W and height H requires the storage of $4WH(x_{search})(y_{search})$ costs. Without the vertical search a three-dimensional cost field would include $2WH(x_{search})$ costs. A three dimensional compressed field $\tilde{C}(x, y|i)$ is $$\tilde{C}(x,y|i)=\arg\min_j C(x,y|i,j),$$

where min represents a minimizing function.

Figure 3:
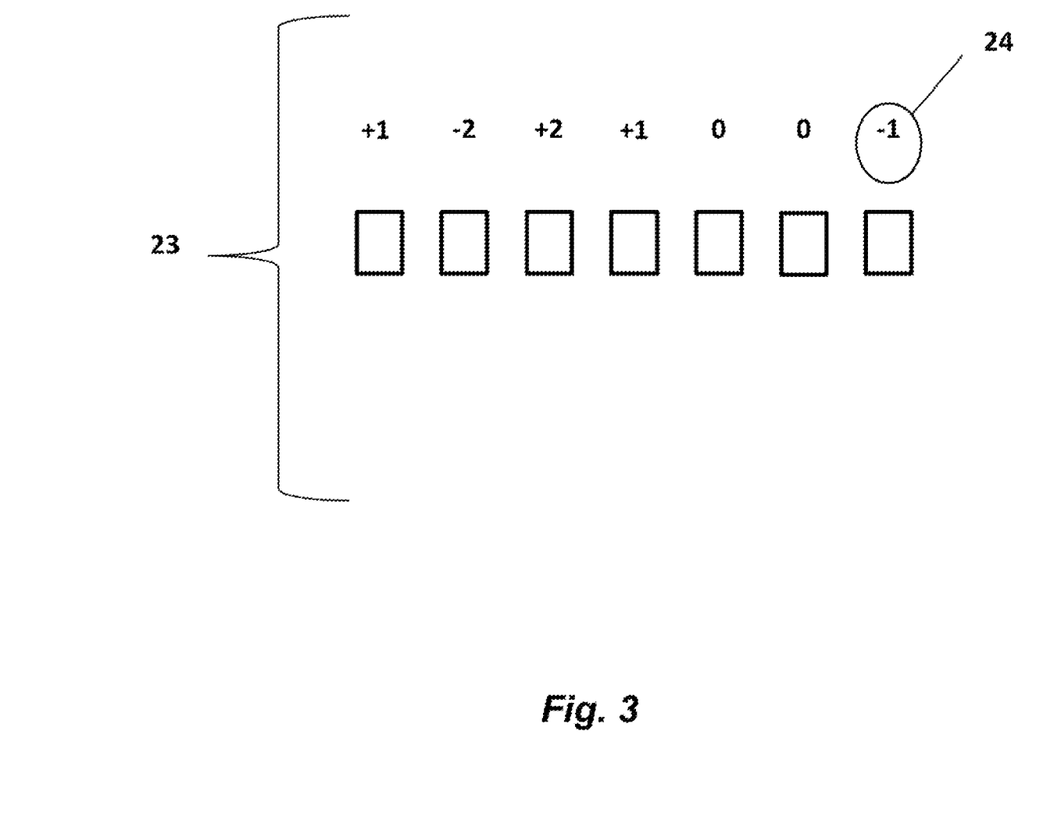
FIG. 3 is a part of a compressed cost table according to embodiments of the invention.

FIG. 3 shows a compressed cost table 23, where each horizontal disparity is associated with the least cost vertical offset 24. In the example shown in FIG. 3, the first three horizontal disparities are associated with vertical offsets +1, −2 and +2, respectively.

Figure 4:
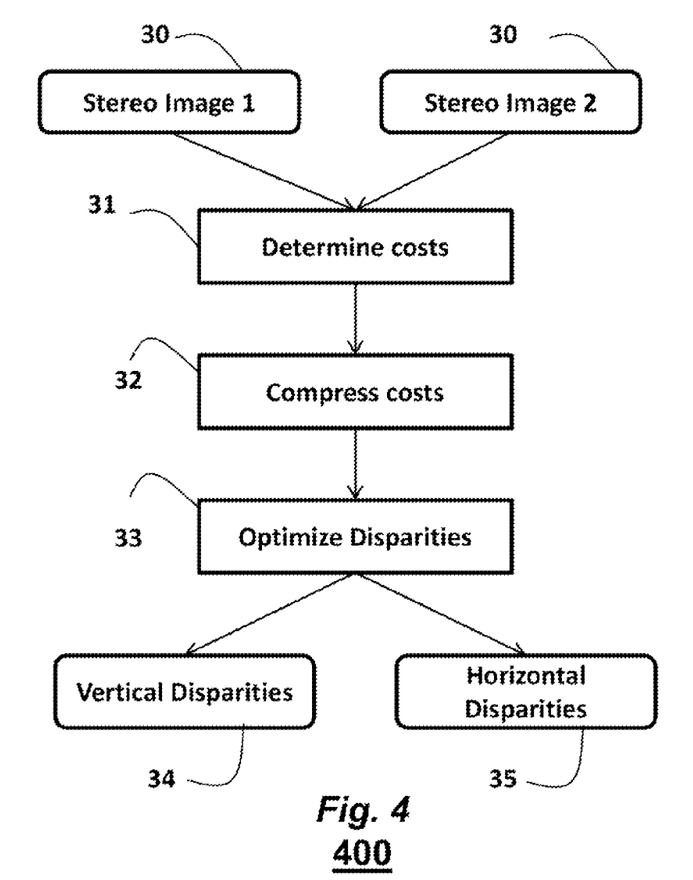
FIG. 4 is a flow diagram of a method for estimating disparity using a search according to embodiments of the invention.

FIG. 4 shows a method 400 for generating horizontal and vertical disparity maps using the costs. For each pair of stereo images 30, we determine 31 the costs. Given the stereo pair 30, a 2D search is performed to generate 31 the cost field, which is compressed 32, and used to optimize 33 the vertical and horizontal disparities 34-35. This relatively slow embodiment provides the optimal quality.

Figure 5:
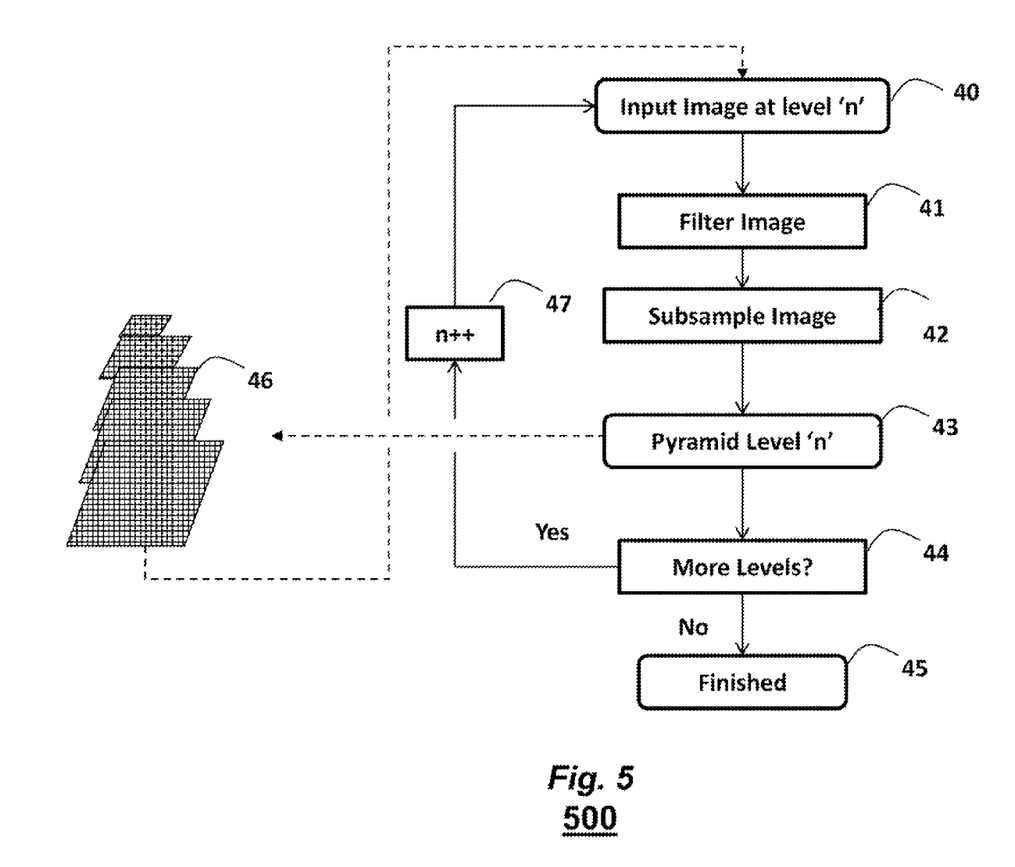
FIG. 5 is a flow diagram of a method for estimating disparity using an image pyramid according to embodiments of the invention.
Figure 6:
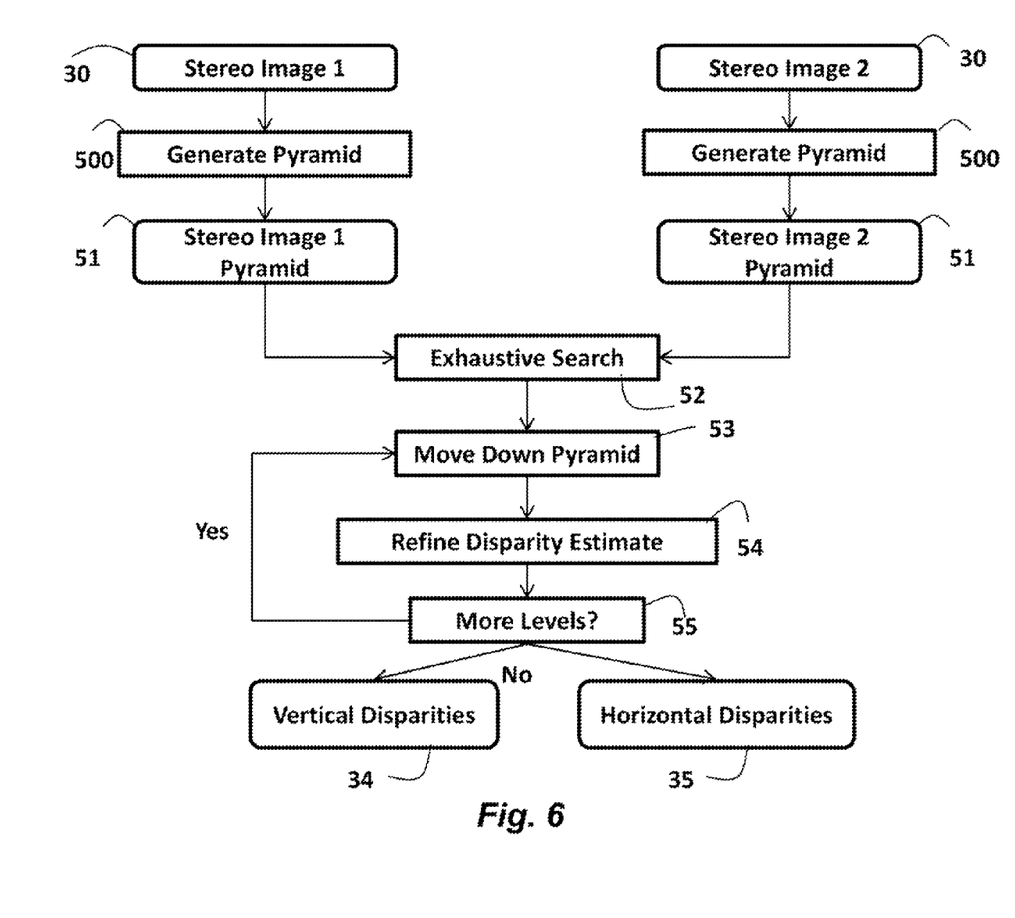
FIG. 6 is a flow diagram of a method for estimating disparity with a combined search and pyramid according to embodiments of the invention.

FIG. 5 shows a procedure 500 that can be used for another embodiment that uses hierarchical processing of an image pyramid 46, sometimes known as a Gaussian pyramid. Level '0' is the image at full resolution. Level 'n' is initialized as 0. The input image at level 'n' is filtered 41, and subsampled 42 to produce a first level in a pyramid 43. If 44 the image is large and additional levels can be used, then level 'n' is increased by one, the current level is subsampled again to produce a next level, which is filtered and subsampled to produce the image at level 'n+1' 47. If 44 the image is small enough and cannot be further subsampled, the procedure is finished 45. Note that level 0 in the pyramid 46 is input of the procedure, while level 1 and above are output of the procedure As shown in FIG. 6, the images in the pyramid can be processed in a coarse to fine order after the pyramid is constructed. This faster embodiment provides a reasonable quality of the disparity. In image processing and computer vision, the terms "coarse" and fine" are well defined terms of art, that refer to the repeated smoothing and subsampling of images to obtain multi-resolution images. That is, a coarser image has a lower resolution than a finer, higher resolution image. Conventionally the pyramid is searched in a "coarse-to-fine" order.

FIG. 6 shows another embodiment 500 that combines the search with the pyramid. Pyramids are generated from the pair of stereo images 30. The pyramids are input to the search 52, moving down 53 for each level of the pyramid to refine 54 the disparities 34-35.

In this case, the sampling can be a nearest neighbour interpolation. In another embodiment the sampling uses a joint bilateral filter. Therefore, the horizontal search at pyramid level n can be performed around $d_x(x, y)$, while vertical search is performed for all of the horizontal disparities. The vertical search range is scaled by $2^n-1$ to avoid a large vertical search. The vertical search is at each level is independent of the search at other levels, and is not affected by errors introduced in the upsampling process. This embodiment balances quality and processing speed.

In another embodiment, a complete "telescopic" search is performed for the horizontal and vertical directions. The search range is changed so that a search is performed at the highest pyramid level, while the previous horizontal and vertical disparities are refined at the lower and coarser levels. When moving down the pyramid 53, the upsampling is performed on both the horizontal and vertical disparity maps. Both maps are scaled such that the offset at the higher level corresponds to the equivalent distance at the lower level. In this way, it is possible to use a small search range for both the horizontal and vertical directions that requires fewer computations. However, the upsampling process can cause errors to accumulate in the horizontal and vertical maps as they are now coupled together. This embodiment provides the shortest processing time, with perhaps a lower quality disparity.

Effect of the Invention

The invention is concerned with direct estimation of image disparity from unrectified pairs of stereo images. The prior art methods generally assume that the input images are rectified.

The various embodiments use a disparity cost map, and can be performed using an image pyramid. The map stores least costs for estimating disparities.

The horizontal disparities are optimized with an existing disparity estimation algorithm to reduce noise from poor matches and ensure consistency of the disparity estimates between neighbouring scanlines. A hierarchical processing scheme is used to speed up the computation and reduce the amount of memory required by the method.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a disparity vector for a pixel in a right image corresponding to a pixel in a left image in a pair of stereo images, wherein the disparity vector is based on a horizontal disparity and a vertical disparity and the pair of stereo images is unrectified, comprising the steps of:

determining a set of candidate horizontal disparities;

calculating, for each candidate horizontal disparity, a cost associate with a particular horizontal disparity and corresponding vertical disparities;

assigning the vertical disparity associated with a first optimal cost to each candidate horizontal disparity, wherein the candidate horizontal disparity and the vertical disparity yield a candidate disparity vector, and wherein the optimal cost is a least cost determined by a matching function $C(x, y|i, j)$ for a horizontal disparity in a bounded horizontal range $x_{-search} \leq i \leq +x_{search}$ and for a vertical disparity in a bounded vertical range $y_{-search} \leq j \leq y_{search}$, and wherein i is a horizontal offset and j is a vertical offset for a pixel in the image at a location (x, y); and selecting the candidate disparity vector with a second optimal cost as the disparity vector of the pixel in the right imager, and wherein the second optimal cost is a least cost determined by the matching function $C(x, y|i, j)$.

2. The method of claim 1, wherein the cost is a least cost.

3. The method of claim 1, further comprising:

performing a bounded two-dimensional search near the pixel.

4. The method of claim 1, wherein the costs form a four-dimensional costs field.

5. The method of claim 4, wherein the cost field is compressed to three dimensions.

6. The method of claim 3, wherein the stereo images are converted to a stereo image pyramid, and the search is conducted from a coarse level to a fine level of the image pyramid.

7. The method of claim 6, wherein a horizontal search at a particular level is performed around a scaled horizontal disparity calculated from a coarser level.

8. The method of claim 6, wherein a vertical search at a particular level is performed around a scaled vertical disparity calculated from a coarser level.

9. The method of claim 6, wherein a vertical search is performed for all of the candidate horizontal disparities.

10. The method of claim 8, wherein a range of the vertical search is scaled according to the level of the pyramid.

11. The method of claim 8, wherein the vertical search at each level is independent of the vertical search at other levels.

* * * * *